(12) United States Patent
Malacarne

(10) Patent No.: US 12,346,157 B2
(45) Date of Patent: Jul. 1, 2025

(54) WEARABLE DEVICE STRAP WITH WATERTIGHT ACTIONABLE PART

(71) Applicant: EM Microelectronic-Marin SA, Marin (CH)

(72) Inventor: Fabien Malacarne, Neuchâtel (CH)

(73) Assignee: EM Microelectronic-Marin SA, Marin (CH)

( * ) Notice: Subject to any disclaimer, the term of this patent is extended or adjusted under 35 U.S.C. 154(b) by 81 days.

(21) Appl. No.: 18/348,519

(22) Filed: Jul. 7, 2023

(65) Prior Publication Data

US 2024/0094772 A1 Mar. 21, 2024

(30) Foreign Application Priority Data

Sep. 15, 2022 (EP) ..................................... 22195891

(51) Int. Cl.
*G06F 1/16* (2006.01)

(52) U.S. Cl.
CPC ............ *G06F 1/163* (2013.01); *G06F 1/1656* (2013.01)

(58) Field of Classification Search
CPC ........ G06F 1/163; G06F 1/1656; G06F 3/011; H05K 5/0086; H04B 1/385; A44C 5/14
See application file for complete search history.

(56) References Cited

U.S. PATENT DOCUMENTS

| | | | |
|---|---|---|---|
| 2012/0081852 A1 | 4/2012 | Maravilla et al. | |
| 2015/0309533 A1* | 10/2015 | Majava | G04G 17/08 |
| | | | 343/718 |
| 2016/0299526 A1 | 10/2016 | Inagaki et al. | |
| 2017/0011210 A1* | 1/2017 | Cheong | A61B 5/681 |
| 2018/0046214 A1* | 2/2018 | Inagaki | H05K 5/0086 |
| 2021/0405592 A1 | 12/2021 | Wu et al. | |
| 2022/0100151 A1 | 3/2022 | Pandya et al. | |

FOREIGN PATENT DOCUMENTS

EP  3 182 223 A1  6/2017

OTHER PUBLICATIONS

European Search Report for EP 22 19 5891 dated Jan. 26, 2023.

* cited by examiner

*Primary Examiner* — James Wu
*Assistant Examiner* — Dakota M Talbert
(74) *Attorney, Agent, or Firm* — Sughrue Mion, PLLC

(57) ABSTRACT

A wearable device (1) including a case (2a, 2b) including a watertight compartment (26) containing a printed circuit board (5), the case (2a, 2b) being assembled to a strap (4a, 4b) for mounting this wearable device (1) on a body part of a user, said assembly of the case (2a, 2b) with the strap (4a, 4b) being configured so that a portion (7) of this strap (4a, 4b) includes at least one actionable part of the device (1).

11 Claims, 5 Drawing Sheets

Fig. 1    Fig. 2    Fig. 3
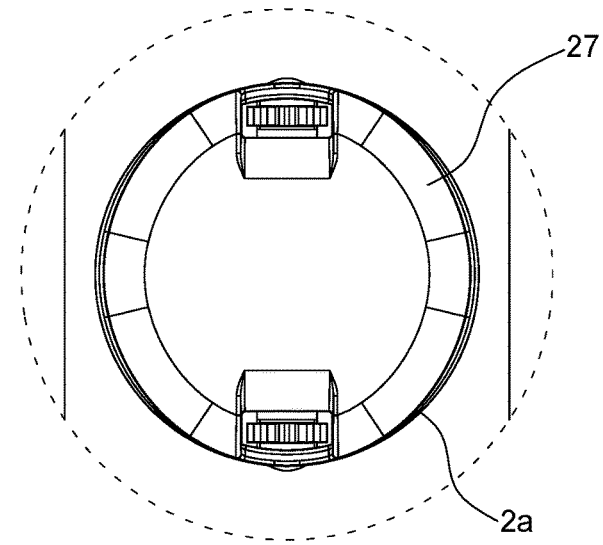
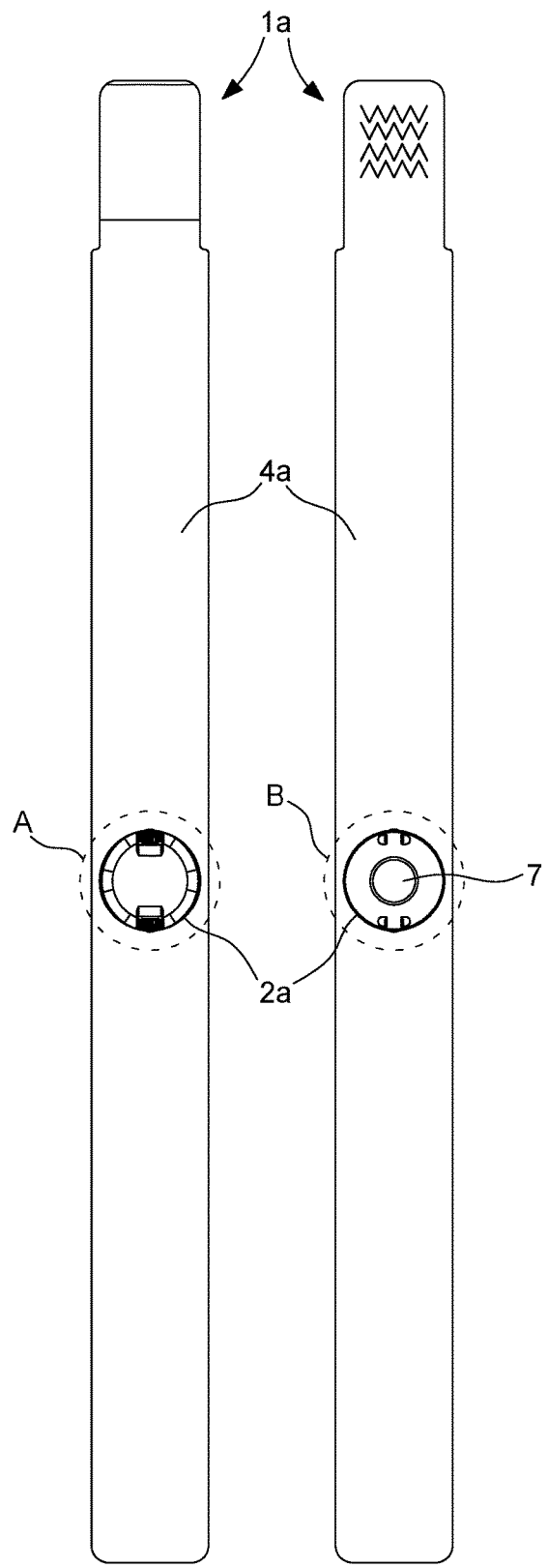
Fig. 4
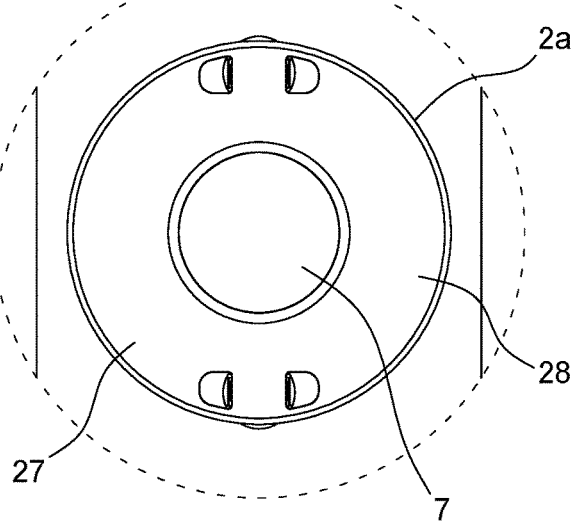

Fig. 6
Fig. 7
Fig. 8
Fig. 9
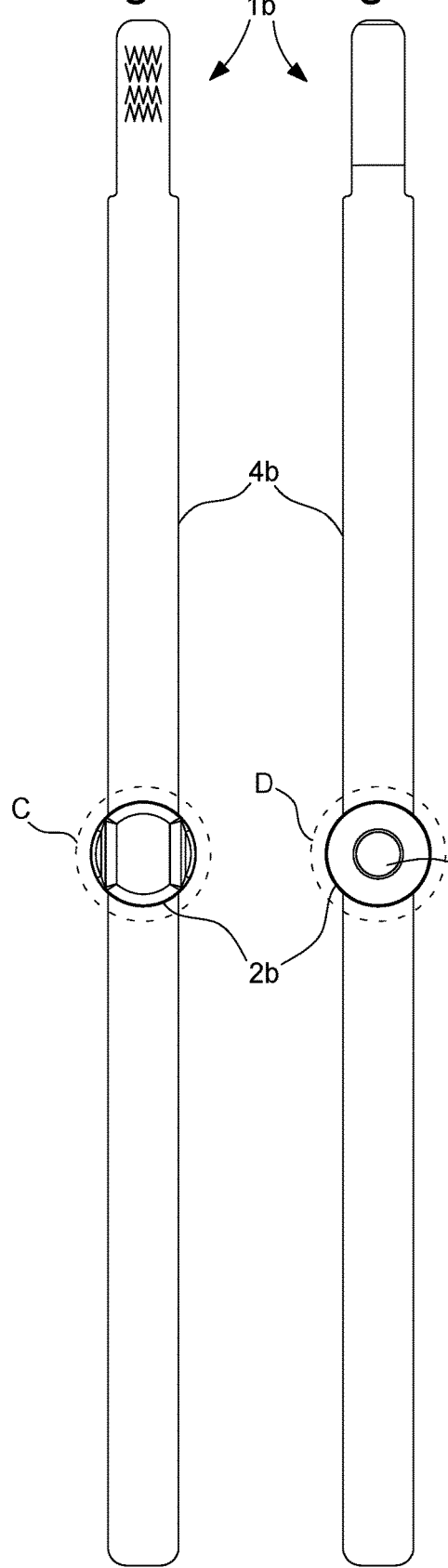
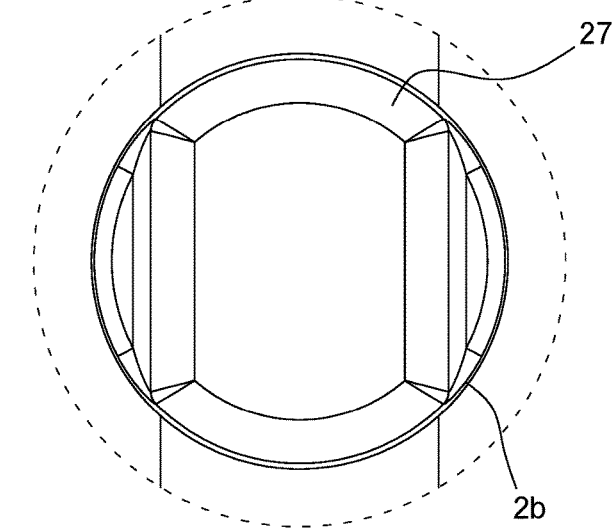
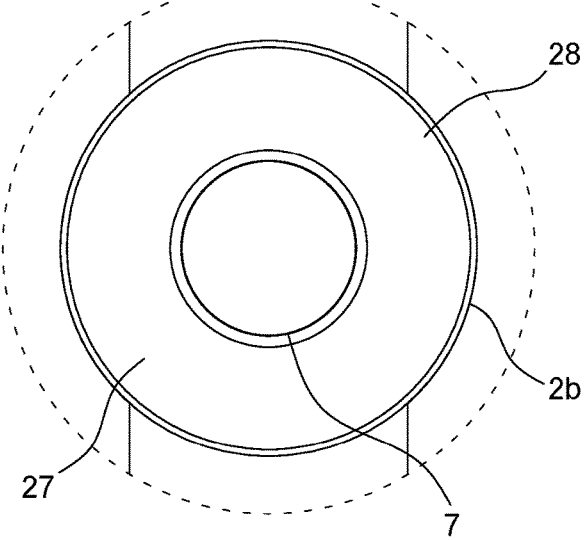

WEARABLE DEVICE STRAP WITH WATERTIGHT ACTIONABLE PART

CROSS REFERENCE TO RELATED APPLICATION

This application claims priority to European Patent Application No. 22195891.1 filed Sep. 15, 2022, the entire contents of which are incorporated herein by reference.

FIELD OF THE INVENTION

The present invention relates to a wearable device capable of being worn on a body part of a user by a strap, band, bracelet, or belt. This wearable device is more specifically a sealed wearable communication device comprising a watertight compartment containing a printed circuit board being able to implement RFID (acronym for Radio Frequency IDentification), NFC (acronym for Near Field Communication) and/or Bluetooth technologies.

BACKGROUND OF THE INVENTION

In the prior art, a small number of electronic devices, like wearable devices, available on the market already have actionable parts, such as push-button switches, in order to stop or start these devices and/or to select a function implemented in these devices. However, the push-button switches used in these devices are not waterproof switches and thus are not effective for waterproofing.

Although other electronic devices like for example professional flashlights, which are not communication devices, have waterproof push-button switches, their functions are simple and their degree of integration is low. Moreover, for these devices, a high complexity and a unique performance of communication components such as Radio Frequency (RF) with an antenna, are not taken into account. Thus, the design scheme of the waterproof push-button switch of these devices is very different from that of the electronic devices implementing module communication and cannot be used in these last ones.

In light of this, there is a need to develop a solution making it possible to overcome the drawbacks of the state of the art.

SUMMARY OF THE INVENTION

In this context, embodiments of the present disclosure provide a wearable device with a switch comprising a watertight compartment containing a printed circuit board, this device being compact and has low manufacturing costs.

To this end, the invention relates to a wearable device comprising a case including a watertight compartment containing a printed circuit board, the case being assembled to a strap for mounting this wearable device on a body part of a user, said assembly of the case with the strap being configured so that a portion of this strap includes at least one actionable part of the device.

In other embodiments:
the said assembly is configured so that the portion of this strap constitutes a part of the case comprising the at least one actionable part;
this portion of the strap forms an area of the case comprising the said at least one actionable part;
the case is formed by a first part and a second part, the second part comprising a hole delimitating the said at least one actionable part;
the strap which is a monobloc piece, is sandwiched between the two parts of the case when this case is assembled with this strap;
the said watertight compartment is formed by a housing with a single opening in which the printed circuit board is arranged and a sealing element is configured for closing this opening;
the housing includes ribbings configured to arrange in its enclosure a peripheral part of a backside face of the printed circuit board in a same plan than a part of a surface of an edge of its opening;
the at least one actionable part is formed by the portion of the strap covering the sealing element, a metal dome switch arranged in the printed circuit board and a part of the sealing element covering this metal dome switch;
the sealing element comprises an adhesive on all or part of its internal face;
the sealing element is single-sided adhesive tape, and
the wearable device is a sealed wearable communication device notably capable of implementing wireless communication technologies like for example RFID, NFC and/or Bluetooth technology.

BRIEF DESCRIPTION OF THE DRAWINGS

The present invention will be described subsequently in more detail with reference to the attached drawing, given by way of examples, but in no way limited thereto, in which:

FIG. 1 represents a view of a rear face of a wearable device, according to a first embodiment of the invention;

FIG. 2 represents a view of a front face or visible part of an external face of a wearable device, according to the first embodiment of the invention;

FIG. 3 is a larger scale view of part A of the FIG. 1, according to the first embodiment of the invention;

FIG. 4 is a larger scale view of part B of the FIG. 2, according to the first embodiment of the invention;

FIG. 6 represents a view of a rear face of a wearable device, according to a second embodiment of the invention;

FIG. 7 represents a view of a front face or visible part of the external face of the wearable device, according to the second embodiment of the invention;

FIG. 8 is a larger scale view of part C of the FIG. 6, according to the second embodiment of the invention;

FIG. 9 is a larger scale view of part D of the FIG. 7, according to the second embodiment of the invention;

DETAILED DESCRIPTION OF THE INVENTION

Figure 5:
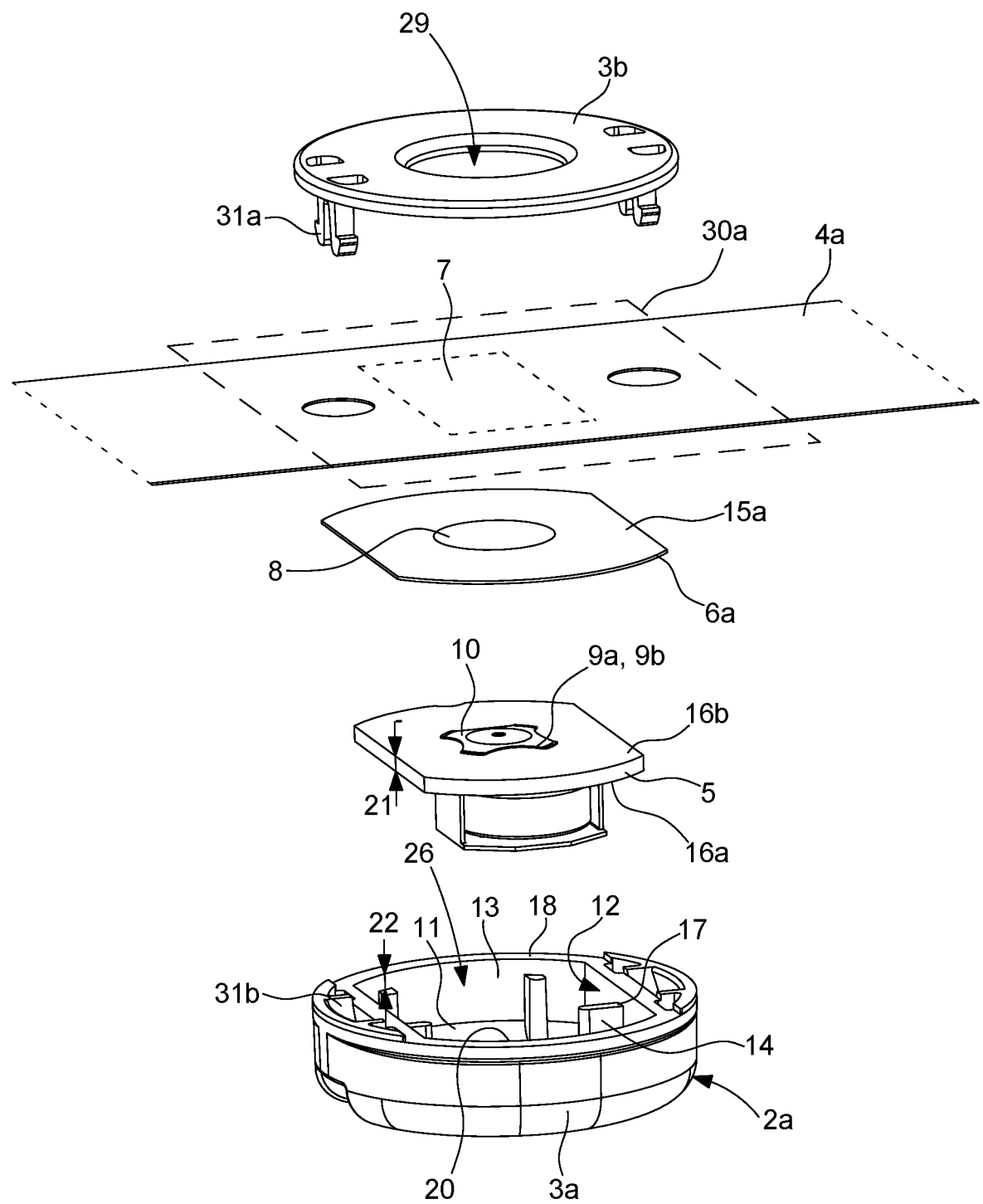
FIG. 5 is an exploded perspective view of the wearable device, according to the first embodiment of the invention.

Throughout and claims, the following terms take the meanings explicitly associated herein, unless the context clearly dictates otherwise. The meaning of "a," "an," and "the" includes plural reference, the meaning of "in" includes "in" and "on." The term "circuit" means either a single component or a multiplicity of components, either active or passive, that are connected together to provide a desired function.

Additionally, directional terms such as "on", "over", "top", "bottom", "left", "right", "upper", "below" are used with reference to the orientation of the Figure(s) being described. Because components of embodiments of the present invention can be positioned in a number of different orientations, the directional terminology is used for purposes of illustration only and is in no way limiting.

In the different embodiments of the invention illustrated in the FIGS. 1 to 9, a wearable device 1 also called "sealed wearable device" or "sealed wearable communication device" is described. The wearable device 1 comprises a central portion such as a case 2a, 2b, and a strap 4a, 4b attached to this case 2a, 2b. This central portion, here the case 2a, 2b, comprises at least one actionable part included on an external face 27 of this case 2a, 2b. More specifically, the said at least one actionable part is included in a visible part 28 of this external face 27 when the device 1 is worn by a living being called in the following description "a user" of this device 1.

As we discussed before, this wearable device 1 is also called sealed wearable communication device because it is able to implement wireless communication technologies like for example RFID, NFC and/or Bluetooth technology.

It can be noted that such a device 1 can be used in particular for wearable and disposable Bluetooth/NFC/RFID devices for people or asset tracking applications. This device 1 can be, for instance, implemented in a wearable device 1 such as activity tracker or another object that is part of the Internet of Things.

In this device 1, the case 2a, 2b, is assembled with the strap 4a, 4b. This strap 4a, 4b also called wristband, bracelet or belt for example, is a monobloc piece. This strap 4a, 4b comprises two free ends provided with complementary attachment elements capable of ensuring the fixing of this device 1 around a body part of the user. Such a strap 4a, 4b is preferably made from a flexible material. This assembly of the case 2a, 2b with the strap 4a, 4b, is configured so that a portion 7 of this strap 4a, 4b includes the said at least one actionable part of this device 1. It can be noted that this portion 7 can be also called "contact portion 7".

This actionable part is reachable or comprised or defined on the external face 27 of the case 2a, 2b, more particularly on/in the visible part 28 of this external face 27 discussed before and which is included in the second part 3b, 3d of the two parts 3a, 3b, 3c, 3d constituting this case 2a, 2b. In this configuration, such actionable part make it possible to activate for example this device 1 that is to say start or stop it, and/or make it possible to select a function of this device 1 for example a tracking function.

This wearable device 1 also comprises a printed circuit board 5. This printed circuit board 5 well known by the acronym PCB and also called PWB for Printed Wiring Board is a laminated sandwich structure of conductive and insulating layers. More specifically, the printed circuit board 5 includes a substrate comprising a backside face 16b and a front face 16a, and also a circuit.

Such a circuit includes electronic components and reliable electrical connections between the terminals of these components in a controlled manner. These electronic components are affixed in designated locations on the outer layers of the substrate forming the front face 16a by means of soldering. This circuit also comprises a battery and at least one switch 9a, 9b used as push button switch 9a, 9b. As discussed before, this circuit can be configured to realise tracking functions. Moreover, this circuit can implement RFID, NFC and/or Bluetooth technologies.

In this device 1, the case 2a, 2b, is defined to include a watertight compartment 26 configured to contain a printed circuit board 5. This watertight compartment 26 comprises notably a sealing element 6a, 6b containing external and internal faces 15a, 15b.

More specifically, as we mentioned before this case 2a, 2b is formed by the first and second parts 3a to 3d. The first part 3a, 3c includes this watertight compartment 26. That watertight compartment 26 is formed by a housing 13 in which the printed circuit board 5 is arranged. This housing 13 comprises a single opening 20 which is susceptible to be closed by the sealing element 6a, 6b. It can be noted that the sealing element 6a, 6b is configured to close this opening 20. In this context, it can be understood that this compartment 26 is mainly formed by the assembly of the housing 13 with the sealing element 6a, 6b.

Such a housing 13 includes an enclosure 11 to receive the printed circuit board 5. This enclosure 11 is formed/delimited by a bottom and the peripheral inner wall 12 of this housing 13, and also by a flat surface of an area delimited/delineated by the opening 20.

This housing 13 also includes ribbings 14 to support the printed circuit board 5, which is arranged in its enclosure 11. More specifically, the ribbings 14 extend in this enclosure 11 from the bottom to the opening 20 of the housing 13. That is, the ribbings 14 extend on the surface of a peripheral inner wall 12 from the bottom to that opening 20 of this housing 13. It can be understood that these ribbings 14 are comprised on a surface of this peripheral inner wall 12 of the housing 13.

Each ribbing 14 includes a reception area 17, which is comprised/formed on a flat upper surface of this ribbing 14. This flat upper surface is arranged in view of the opening 20. In other words, this reception area 17 is arranged in view of the surface of the area delimited by the opening 20 and is also parallel or significantly parallel to this surface delineated by this opening 20.

This reception area 17 of each ribbing 14 is configured to cooperate with a peripheral area of the front face 16a the printed circuit board 5 in order to support this board 5 in the enclosure 11 of the housing 13. This peripheral area of the front face 16a of the printed circuit board 5 can be fixed to the corresponding reception areas 17 of the housing 13 for example by being bonded to these areas and/or clipped and/or screwed and/or crimped.

Figure 10:
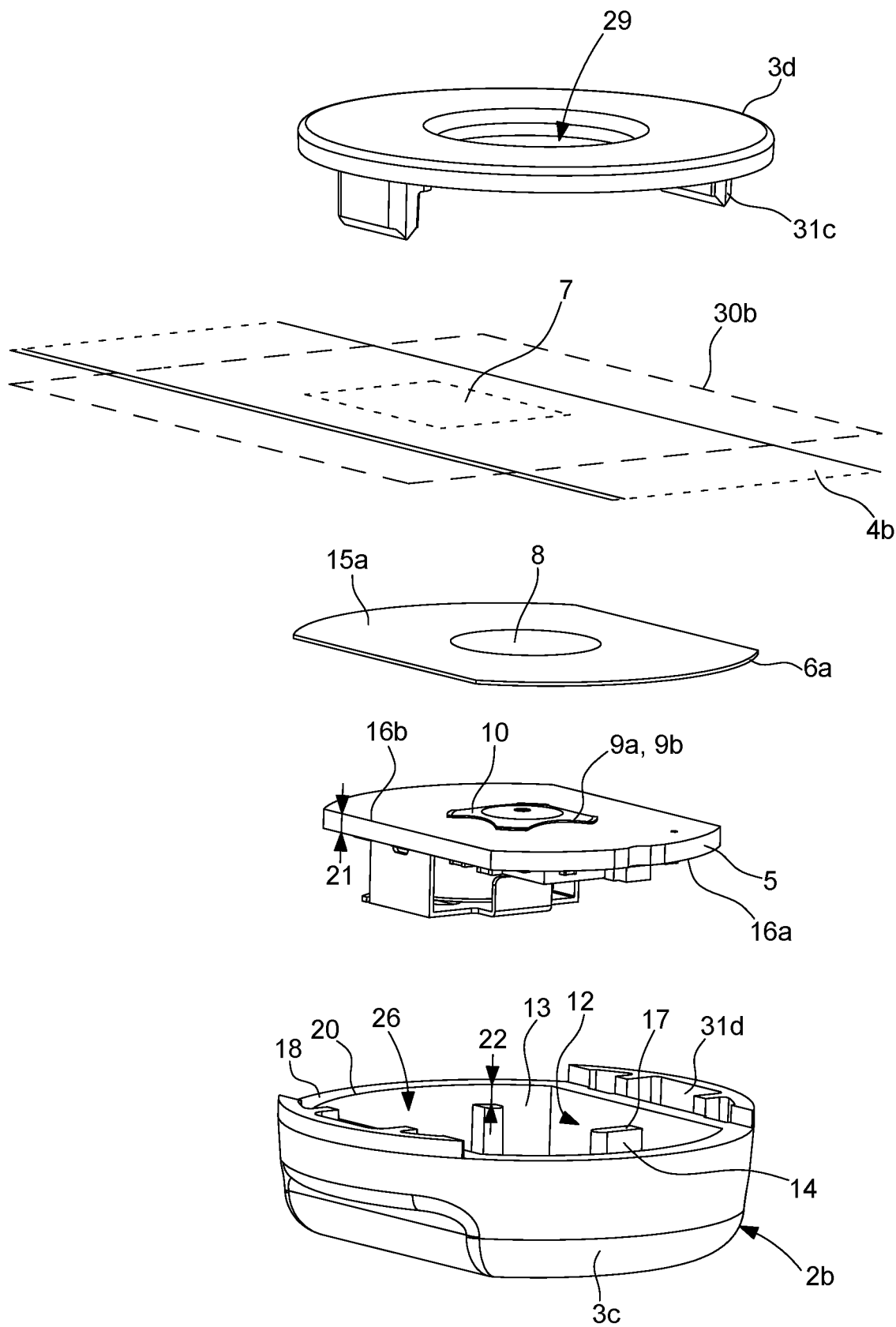
FIG. 10 is an exploded perspective view of the wearable device, according to the second embodiment of the invention.

It can be noted that a distance 22 between each reception area 17 and the surface delineated by the opening 20 is equal or noticeably equal to the thickness 21 of the printed circuit board 5. Thus when the printed circuit board 5 is arranged in the enclosure 11 of the housing 13, a peripheral part of the backside face 16b of the printed circuit board 5 is in a same plan of a part of a surface of an edge 18 of the opening 20 visible on the FIGS. 5 and 10.

In this configuration, the second part 3b, 3d of the case 2a, 2b, is a complementary element to the first part 3a, 3c. In other words, this second part 3b, 3d has a structure or a shape complementary to that of this first part 3a, 3c. More specifically, this second part 3b, 3d comprises a hole 29, which has a shape essentially circular. It can be noted that this second part 3b, 3d is configured to define a closed internal volume of an enclosure of this device 1 by being fixed/assembled with/to this first part 3a, 3c. Such an internal volume includes the watertight compartment 26.

As already mentioned, the circuit comprises at least one switch 9a, 9b used as push button switch 9a, 9b. According to FIGS. 5, 10 and 11A to 12B, this switch 9a, 9b can be a metal dome switch 9a, 9b formed notably by a metal dome 10 and conductive tracks 19 comprised on the backside face 16b of the substrate. The metal dome 10 is arranged in this circuit in order to cooperate with the conductive tracks 19 particularly when the switch 9a, 9b is operated.

Figure 11A:
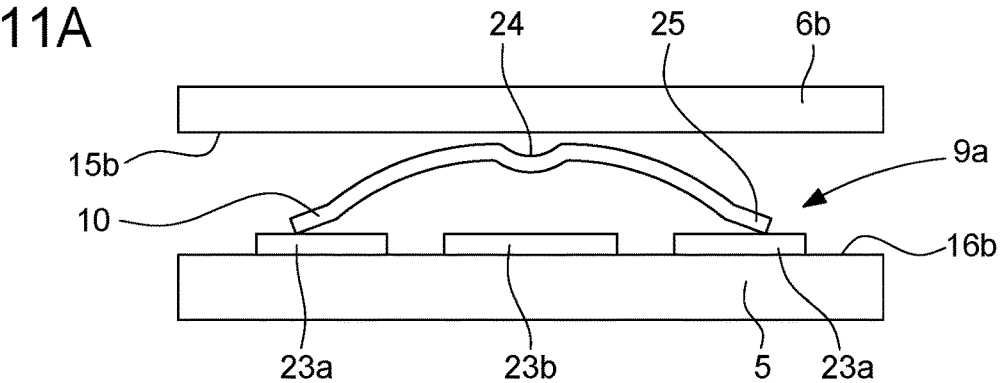
FIGS. 11A, 11B, 12A and 12B are schematic views of different embodiments of a metal dome switch comprised in the wearable device, according to the first and second embodiments of the invention.
Figure 11B:
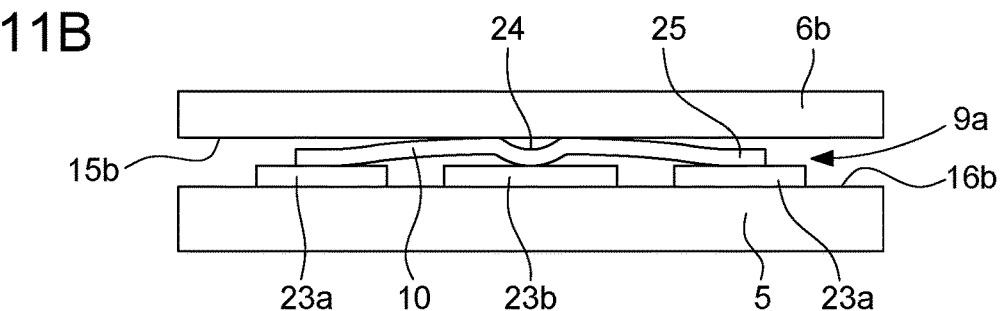

In the FIGS. 11A and 11B, the metal dome switch 9a can be tactile. This tactile metal dome switch 9a is a momentary switch designed to provide a tactile response when the actionable part of the device 1 is pressed/operated to be activated. In other words, that tactile switch 9a is a momentary switch 9a as it will only work when it is physically held down or pressed via this actionable part. Once pressure is released, this switch 9a will disconnect, and the action will stop. In the device 1, there is an overlay on the top of the switch 9a that sits above the metal dome 10. More particularly, the metal dome 10 is covered by a contact portion 8 of the sealing element 6a of this device 1. In this switch 9a, the metal dome 10 comprises a peripheral portion 25 soldered to first conductive tracks 23a. In this configuration, when the actionable part is pressed down, the metal dome 10 changes from a state of rest to a state of constraint during which its center 24 is connected with a second conductive track 23b in order to activate/deactivate the device 1. When the pressure on the actionable part is released, the metal dome 10 is disconnected from this second conductive track 23b by returning to its state of rest.

In an alternative of this tactile metal dome switch 9a, the metal dome 10 is not soldered to first conductive tracks 23a. More specifically this tactile metal dome 10 is connected to these first conductive tracks 23a when the sealing element 6b of the device 1 on which this metal dome 10 is already fixed, covers the backside face 16b of the substrate.

Figure 12A:
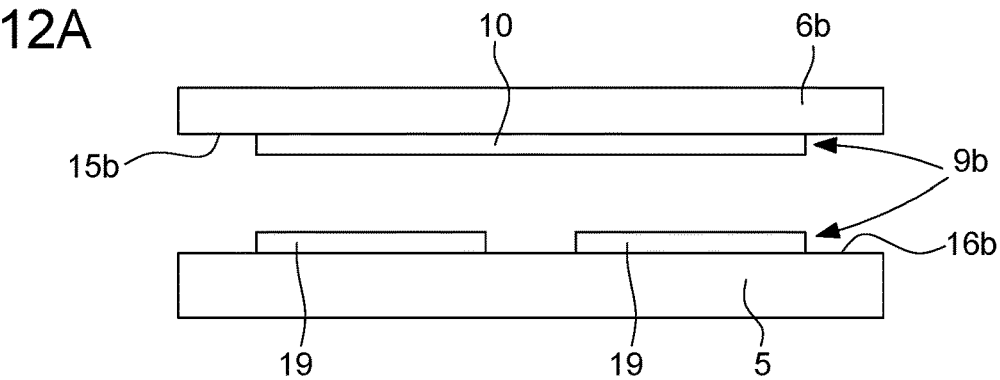
Figure 12B:
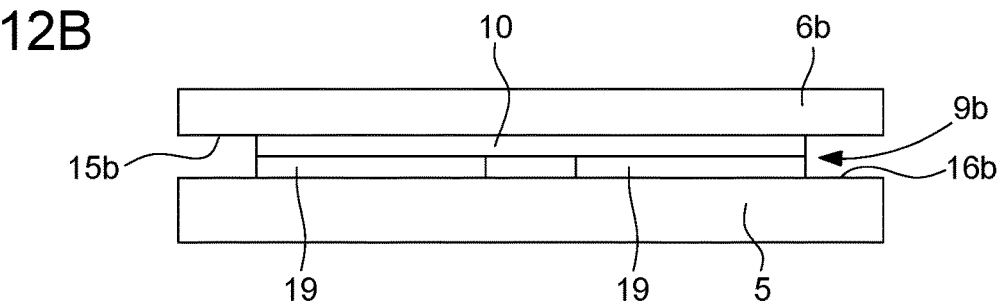

In the FIGS. 12A and 12B, the metal dome switch 9b can be non-tactile. This non-tactile metal dome switch 9b works the same as the tactile metal dome switch 9a except there is no physical response when pressed. In this device 1, the metal dome 10 is fixed to the contact portion 8 of the sealing element 6b of this device 1. In this configuration, when the actionable part is pressed down, the contact portion 8 changes from a state of rest to a state of constraint during which the metal dome 10 is connected with conductive tracks 19 in order to activate/deactivate the device 1. When the pressure is released, the metal dome 10 is disconnected from this conductive tracks 19 and the contact portion 8 returns to its state of rest.

As we discussed before, the watertight compartment 26 includes at least one actionable part reachable or comprised or defined on the visible part 28 of this external face 27 discussed before and which is comprised in the second part 3b, 3d of the case 2a, 2b.

In this device 1, the case 2a, 2b, is assembled with the strap 4a, 4b. In this configuration, the strap 4a, 4b is sandwiched between the two parts 3a, 3b of the case 2a, 2b. More specifically, a central part 30a, 30b of this strap 4a, 4b is sandwiched between these two parts. 3a, 3b.

In the first embodiment of the invention illustrated on the FIGS. 1 to 5, the first and second parts 3a, 3b of the case 2a comprise complementary fastening elements 31a and 31b which are able to go through openings include in the central part 30a of this strap 4a.

In the second embodiment illustrated on the FIGS. 6 à 10, the first and second parts 3c, 3d of the case 2b also comprise complementary fastening elements 31c and 31b between which the central part 30b of the strap 4b is arranged.

In this two embodiments, this central part 30a, 30b of the strap 4a, 4b covers the external face 15a of the sealing element 6a, 6b. In other words, this central part 30a, 30b of the strap 4a, 4b is arranged between the sealing element 6a, 6b and the second part 3b, 3d of the case 2a, 2b. The portion 7 of this strap 4a, 4b, and more particularly of the central part 30a, 30b of this trap 4a, 4b, comprising the said at least one actionable part is visible through the hole 29 included in the second part 3b, 3d. In other words, this portion 7 is a zone of the central part 30a, 30b of this strap 4a, 4b which is not covered by the second part 3b, 3d of this case 2a, 2b. It can be noted that this hole 29 delimitates the said at least one actionable part on the external face 27 of the case 2a, 2b.

It can be understood that the assembly of the case 2a, 2b with the strap 4a, 4b, is configured so that the portion of this strap 4a, 4b constitutes a part of the case 2a, 2b comprising the at least one actionable part. Moreover, this portion of the strap 4a, 4b forms an area of the case 2a, 2b comprising the said at least one actionable part.

As we explained before, this second part 3b, 3d is the complementary element of the first part 3a, 3c of the case 2a, 2b. In this configuration, the actionable part is reachable from the visible part 28 of the external face 27 of this second part 3b, 3d of the case 2a, 2b. More specifically, this actionable part is formed by the switch 9a, 9b, a contact portion 8 of the sealing element 6a, 6b and the contact portion 7 of the strap 4a, 4b. This contact portion 7 is included in the central part 30a, 30b of the strap 4a, 4b and accessible from the hole 29 comprised in this second part 3b, 3dM. This contact portion 7 is located above and preferably in contact with the contact portion 8 of the sealing element 6a, 6b. In this configuration, that contact portion 8 of the sealing element 6a, 6b also covers the metal dome 10, preferably the completeness of this metal dome 10.

In this configuration, such actionable part make it possible to activate for example this device 1 that is to say start or stop it, and/or make it possible to select a function of this device 1 for example a tracking function.

In this device 1, the sealing element 6a, 6b is made from a flexible and thin material and comprises an adhesive layer located on all or part of its internal face 15b. More specifically, this sealing element 6a, 6b is a single-sided adhesive tape. In this configuration, when the sealing element 6a, 6b closes the opening 20 of the housing 13, its internal face 15b is pasted to the surface of the edge 18 of this opening 20.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. A wearable device comprising:
a case including a watertight compartment containing a printed circuit board therein, and a strap assembled to the case for mounting the wearable device on a body part of a user, the case and the strap forming an assembly which is configured so that a portion of the strap includes at least one actionable part of the wearable device,
wherein the strap is extended through an inside of the watertight compartment, and
wherein the at least one actionable part of the wearable device is configured to be actionable by a pressing against the at least actionable part in a direction perpendicular to a plane in which the strap, along a longitudinal direction of the strap, is extended through the inside of the watertight compartment, wherein the actionable part of the wearable device is actionable by the pressing, and, by a layering of the strap and the case, the pressing is received to the actionable part through a part of the strap within the watertight compartment.

2. The wearable device according to claim 1, wherein the assembly is configured so that the portion of the strap constitutes a part of the case comprising the at least one actionable part.

3. The wearable device according to claim 1, wherein the portion of the strap forms an area of the case comprising the said at least one actionable part.

4. The wearable device according to claim 1, wherein the case is formed by a first part and a second part, the second part comprising a hole delimitating the at least one actionable part.

5. The wearable device according to claim 1, wherein the case is formed by a first part and a second part, the second part comprising a hole delimitating the at least one actionable part, the strap which is a monobloc piece, being sandwiched between the first and second parts of the case when the case is assembled with the strap.

6. The wearable device according to claim 1, wherein the watertight compartment is formed by a housing with a single opening in which the printed circuit board is arranged and a sealing element is configured for closing the opening.

7. The wearable device according to claim 1, wherein the housing includes ribbings configured to arrange in an enclosure therein a peripheral part of a backside face of the printed circuit board in a same plane than a part of a surface of an edge of its opening.

8. The wearable device according to claim 1, wherein the at least one actionable part is formed by the portion of the strap covering the sealing element, a metal dome switch arranged in the printed circuit board and a part of the sealing element covering the metal dome switch.

9. The wearable device according to claim 1, wherein the sealing element comprises an adhesive on all or part of an internal face thereof.

10. The wearable device according to claim 1, wherein the sealing element is single-sided adhesive tape.

11. The wearable device according to claim 1, wherein the wearable device is a sealed wearable communication device configured to implement wireless communication technologies including RFID, NFC and/or Bluetooth technology.

* * * * *